Figure 1:
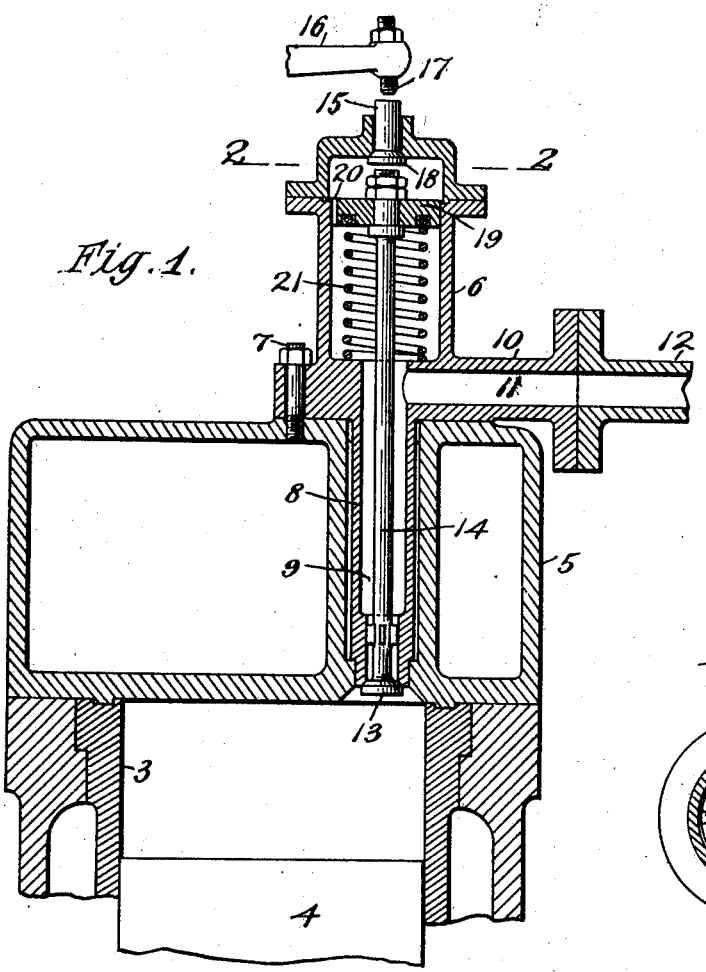

May 26, 1925.

O. E. JORGENSEN 1,538,897

STARTING VALVE FOR INTERNAL COMBUSTION ENGINES

Filed April 19, 1920

INVENTOR
Olav Eskil Jorgensen
BY
ATTORNEYS

Patented May 26, 1925.

1,538,897

UNITED STATES PATENT OFFICE.

OLAV ESKIL JORGENSEN, OF NEW YORK, N. Y.

STARTING VALVE FOR INTERNAL-COMBUSTION ENGINES.

Application filed April 19, 1920. Serial No. 374,899.

*To all whom it may concern:*

Be it known that I, OLAV ESKIL JORGENSEN, a subject of the Kingdom of Denmark, residing at New York, county of New York, and State of New York, have invented certain new and useful Improvements in Starting Valves for Internal-Combustion Engines, fully described and represented in the following specification and the accompanying drawings, forming a part of the same.

This invention relates to internal combustion engines, and particularly to starting valves therefor.

In certain types of internal combustion engines, such, for example, as the Diesel engine, the engine is started by means of compressed air introduced into the cylinders. In engines of this type, as heretofore known, difficulty has been experienced with the mechanism controlling this introduction of compressed air, in that the moving parts sometimes stick, particularly after long periods of disuse as in ship engines.

For example, one known type of starting valve mechanism comprises a valve stem having its upper end projecting through the valve casing into the path of the valve lever. On this valve stem is a piston-like member having an air-tight fit in the casing, thus serving as a guide member and to confine the compressed air in the valve chamber. This tight fitting member often sticks in the casing and thus interferes with the proper operation of the starting mechanism.

It is the principal object of the present invention to provide a starting valve mechanism such that none of the moving parts is liable to stick.

With this general object in view, the invention consists in the combinations, details of construction and arrangement of parts which will first be described in connection with the accompanying drawing and then more particularly pointed out.

In the drawing—

Figure 2:
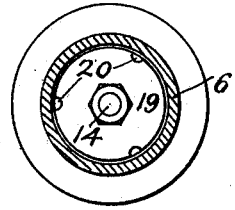

Fig. 1 is a view in vertical section of a starting valve mechanism constructed in accordance with the invention; and Fig. 2 is a cross-sectional view taken on the line 2—2 of Fig. 1.

Referring to the drawing, 3 represents a cylinder of an internal combustion engine, in which reciprocates a piston 4.

At the end of the cylinder is a head 5 on the top of which a valve casing 6 is mounted by means of one or more bolts 7. This valve casing, which, in the present exemplification, has a cylindrical portion 8 passing down through a suitably arranged opening in the head 5, forms a valve chamber 9 opening into the cylinder. The casing 6 has a connection adapted to communicate with a source of compressed air or the like. As here shown, as an example, the casing 6 has a side connecting member 10 located above the head 5 and enclosing a passage 11 opening directly into the chamber 9. This connecting member is shown, conventionally, as joined to a pipe 12 leading to a source of compressed air.

The invention includes a starting valve for normally shutting off the chamber 9 from the cylinder. Although capable of various constructions, in that shown, the rim of the cylindrical portion 8 of the casing 6 is bevelled to form a seat for a conical valve 13.

The invention includes an actuator, and valve operating means comprising a part projecting through the wall of the casing for co-operation with the actuator. In constructions embodying the invention to the best advantage, the starting valve is carried by a valve stem and this stem is operated by a separate plunger projecting through the wall of the casing. Although capable of various constructions, in the present embodiment, the valve 13 is integral with a valve stem 14 extending nearly to the top of the chamber 9. In alignment with this valve stem and separated therefrom by a small space, is a plunger 15 projecting through the wall of the casing and freely slidable therein. Above the outer end of the plunger 15 is the actuator, here shown as a valve lever 16 carrying a contact pin 17.

The invention includes a valve for normally closing the opening through which the plunger 15 projects, and in constructions embodying the invention to the best advantage this valve is normally held closed by the air pressure in the chamber. Although capable of various constructions, in that illustrated the inner end of the plunger 15 is headed to form a conical valve 18 seating on a bevelled seat formed on the wall of the casing around the plunger's opening. The plunger is freely suspended in the casing wall so that normally the valved end 18 is held against its seat by the air pressure in the chamber.

There is provided for the valve stem a guide member arranged to permit free circulation of air in the chamber. In the present explification, mounted on the valve stem near its upper end, is a guide collar 19 freely slidable in the upper portion of the casing. To permit circulation of the air this guide collar is formed with several air passages 20. These permit free passage of the air into that part of the chamber above the guide collar.

Means is provided for normally holding the starting valve closed. As shown in the present exemplification, between the guide collar 19 and a portion of the casing is a coiled spring 21, the force of which tends to lift the valve stem, thus normally holding the valve 13 against its seat.

The operation of the device described is as follows: Under normal conditions, the chamber 9 is in communication with the source of compressed air, the air being confined within the chamber by the starting valve 13, which is held closed by its spring, and the valve 18, which is held closed by the air pressure itself. When it is desired to introduce air into the cylinder to start the engine, the valve lever 16 is operated in any suitable manner (well known in the art) to engage and displace the plunger 15. As the plunger is actuated it strikes the end of the valve stem 14 and depresses the same, thus moving the starting valve away from its seat to permit the flow of air into the cylinder. As soon as the valve lever 16 is elevated again, the plunger valve 18 is free to be seated under the pressure of the air, and the valve stem is free to be moved back by its spring to reseat the starting valve.

With the construction described, there are no parts likely to stick, as there are no sliding parts having a tight fit. The air is confined in the chamber by valves moving directly toward and away from their seats and opened by positive mechanical action, and the guide collar 19 and plunger 15 have a free fit so as to avoid sticking of these parts. The pressures on the piston 19 are balanced, so that the valve does not open against heavy air pressure, while the plug valve 18 closes at once on release by the actuator, being free from the valve stem and with lost motion between it and the actuator. Lost motion is provided, also, between the plunger 15 and the valve stem, so that the valve 13 closes independently of the plunger. The valve 18 seals the starting valve chamber at once on the release of the actuator, so that waste of pressure air is avoided. As a result, proper operation of the starting valve mechanism is at all times obtainable, regardless of long periods of disuse, and the construction is certain in operation and economical.

The construction described provides, further, a starting valve mechanism such that there is no danger of the fuel working into the compressed air supply, as the passage 11 opens directly into the chamber 9 and is located above the head 5, so that the passage of the fuel to the compressed air supply is opposed by the constant air pressure and gravity.

What is claimed is:

1. In an internal combustion engine, in combination with a cylinder, a chamber formed within a casing having an opening connecting with the cylinder, a plunger opening through the casing wall, and a pressure air connection, a starting valve acting to shut off the chamber from the cylinder during the normal operation of the engine, a valve stem on which the starting valve is carried, an actuator outside the casing, a plunger operating through the plunger opening free to move outward independently of the valve stem but moved into engagement with the valve stem by the actuator to move the valve stem and open the starting valve for starting the engine, and a valve carried by said plunger and acting to close the plunger opening during the normal operation of the engine.

2. In an internal combustion engine, in combination with a cylinder, a casing having an opening connecting with the cylinder, a plunger opening, and a connection communicating with a source of compressed air, a valve controlling the opening into the cylinder, a valve stem on which the valve is carried, an actuator outside the casing, a separate plunger operating through the plunger opening free to move independently of the valve stem but moved into engagement with the valve stem to actuate the valve for opening the cylinder opening, and a valve carried by said plunger and held closed by the air pressure in the chamber to close the plunger opening when the cylinder opening is closed.

3. In an internal combustion engine, in combination with a cylinder, a casing forming a chamber opening into said cylinder and having a connection adapted to communicate with a source of compressed air, a starting valve for normally shutting off said chamber from the cylinder, a valve stem on which said starting valve is carried, an actuator, a plunger projecting through the wall of the casing for co-operation with said actuator and arranged to displace the valve stem when operated by the actuator, a valve associated with said plunger for normally closing the opening through which the plunger projects, a guide member on said valve stem slidable in the casing and formed to permit free circulation of the air in the chamber, and means for normally holding the starting valve closed.

4. In an internal combustion engine, in combination with a cylinder, a casing forming a chamber opening into said cylinder and having a connection adapted to communicate with a source of compressed air, a starting valve for normally shutting off said chamber from the cylinder, a valve stem with which said starting valve is integrally formed, a guide member on said valve stem slidable in the casing and formed to permit free circulation of the air in the chamber, an actuator, a plunger projecting through the wall of the casing to cooperate with said actuator, said plunger being freely suspended in the casing wall in alignment with the valve stem and headed on its inner end to form a valve for normally closing the opening through which the plunger projects, and means for normally holding the starting valve closed.

In testimony whereof, I have hereunto set my hand.

OLAV ESKIE JORGENSEN.